(12) United States Patent
Yamamoto et al.

(10) Patent No.: US 8,931,324 B2
(45) Date of Patent: Jan. 13, 2015

(54) AUTOMATIC TORQUE CALIBRATION DEVICE

(75) Inventors: Akimasa Yamamoto, Kyoto (JP); Katsuhiko Keno, Kyoto (JP)

(73) Assignee: Horiba, Ltd., Kyoto (JP)

( * ) Notice: Subject to any disclaimer, the term of this patent is extended or adjusted under 35 U.S.C. 154(b) by 846 days.

(21) Appl. No.: 13/163,924

(22) Filed: Jun. 20, 2011

(65) Prior Publication Data

US 2011/0308295 A1    Dec. 22, 2011

(30) Foreign Application Priority Data

Jun. 21, 2010    (JP) ................. 2010-140187

(51) Int. Cl.
  *G01L 25/00*    (2006.01)
(52) U.S. Cl.
  CPC .................... *G01L 25/003* (2013.01)
  USPC ........................................................... 73/1.09
(58) Field of Classification Search
  CPC ............................ G01L 3/1464; G01L 25/003
  USPC ........................................................... 73/1.09
  See application file for complete search history.

(56) References Cited

U.S. PATENT DOCUMENTS

2011/0167890 A1*    7/2011   Cottogni ..................... 73/1.09

FOREIGN PATENT DOCUMENTS

| CN | 2881580 Y | | 3/2007 |
|---|---|---|---|
| DE | 102007040106 | * | 2/2009 |
| FR | 2883374 A1 | * | 9/2006 |
| JP | 08-304211 | | 11/1996 |
| JP | 09-113396 | | 5/1997 |
| JP | 2011-064146 | | 3/1999 |
| JP | 2004-150845 | | 5/2004 |
| WO | WO 2008061629 A1 | * | 5/2008 |

OTHER PUBLICATIONS

English machine translation of WO 2008061629 A1. Retrieved from WIPO May 14, 2014.*

* cited by examiner

*Primary Examiner* — Hezron E Williams
*Assistant Examiner* — Mark A Shabman
(74) *Attorney, Agent, or Firm* — Brooks Kushman P.C.

(57) ABSTRACT

The present invention provides an easy-of-use torque calibration device capable of improving workability and safety and attaining reduction in time of a torque calibration in calibrating a torque of a dynamometer. That is, the present invention includes a connecting shaft coaxially connected to a torque measurement rotor, a calibration arm integrally rotated with the connecting shaft, a plurality of calibration weights for applying loads to both ends of the calibration arm, a moving mechanism to move the connecting shaft between a connection position and a spaced position, and a rotating direction fixing mechanism for fixing the torque measurement rotor and the connecting shaft in the rotating direction at the connection position, and a control unit controlling the moving mechanism.

4 Claims, 13 Drawing Sheets

AUTOMATIC TORQUE CALIBRATION DEVICE

CROSS-REFERENCE TO RELATED APPLICATION

This application claims priority to Japanese Patent Application No. 2010-140187 filed Jun. 21, 2010, the disclosure of which is incorporated in its entirety by reference herein.

TECHNICAL FIELD

The present invention generally relates to a torque calibration device and, in particular, relates to an automatic torque calibration device for calibrating a torque measurement value obtained by a dynamometer such as an engine dynamo or a chassis dynamo.

BACKGROUND ART

Conventionally, as disclosed in, e.g., Patent Literature 1, a torque calibration of a dynamometer such as an engine dynamo or a chassis dynamo is carried out by fixing a calibration arm to a torque measurement rotor such as, e.g., a rotating drum or a rotating shaft of a dynamometer.

This fixation of the calibration arm is manually performed by a user. More specifically, the user lifts the calibration arm to a predetermined position of the torque measurement rotor to be maintained still and then the calibration arm is bolted in this state to be fixed to the torque measurement rotor.

However, the calibration arm may be large in size and weight in some cases and, therefore, a plurality of workers are required to perform the fixation work and there is also required a fixing instrument in addition. Thus, the fixation work becomes a heavy and big work. There is also a problem that the fixation work is troublesome and it takes a long time to do the work. In addition, there is also a fear of dropping or falling of the calibration arm, and there is a problem in terms of safety.

After the calibration arm is fixed to the torque measurement rotor, the calibration is performed by suspending or placing calibration weights on the calibration arm one by one.

In the calibration work, the calibration weights are manually suspended or placed on the calibration arm by a user. Each of the calibration weights is heavy (as much as, e.g., 20 kg) and the work of placing the calibration weights on the calibration arm is a heavy work and there is a difficulty in terms of safety and workability.

In view of these problems as mentioned above, in order to reduce the work of suspending or placing the calibration weights on the calibration arm, there is suggested an automatic mounting device for automatically mounting calibration weights on a calibration arm, as disclosed in Patent Literature 2.

However, even in the case of using this automatic mounting device, the work of fixing the calibration arm to a torque measurement rotor is manually performed by a user, and it is further necessary to move the automatic mounting device near the calibration arm. In addition, when each of the calibration weights is placed on the calibration arm, it is necessary for the user to operate the automatic mounting device, and therefore the user is inevitably attending to the automatic mounting device all the time during the calibration.

Even though there can be reduce a burden of suspending or placing work of the calibration weights, the torque calibration is still accompanied by a manual work of fixing the calibration arm and, therefore, there is a difficulty in terms of safety and workability. Also, there is a problem that it takes a long time in an operation from the fixation of the calibration arm to an end of the torque calibration. Further, since it is necessary to operate the automatic mounting device during the torque calibration, there is a problem that the user subjects to constraints in time during the torque calibration.

CITATION LIST

Patent Literature

Patent Literature 1: JP-A-Heisei 11-64146
Patent Literature 2: JP2004-150845A

SUMMARY OF INVENTION

Technical Problem

Therefore, the present invention has been made to solve the above problems at once, and an essential object thereof is to provide an easy-of-use automatic torque calibration device capable of improving workability and safety and attaining reduction in time of a torque calibration in calibrating a torque of a dynamometer.

Solution to Problem

That is, an automatic torque calibration device according to the present invention is connected to a torque measurement rotor of a dynamometer to execute a torque calibration of the dynamometer. The automatic torque calibration device includes: a connecting shaft rotatably provided with respect to a base platform and coaxially connected to the torque measurement rotor; a calibration arm integrally rotated with the connecting shaft and extended with respect to the connecting shaft; a moving mechanism adapted to move the connecting shaft between a connection position where the connecting shaft is connected to the torque measurement rotor and a spaced position spaced away from the torque measurement rotor; a rotating direction fixing mechanism engaged with an engaged part provided on the torque measurement rotor at the connection position so as to fix the torque measurement rotor and the connecting shaft in the rotating direction; and a control unit adapted to control the moving mechanism. In this arrangement, the control unit controls the moving mechanism to move the connecting shaft to the connection position so as to fix the torque measurement rotor and the connecting shaft to be connected in the rotating direction by the rotating direction fixing mechanism.

With this configuration as described above, it is possible to automatically connect the calibration arm to the torque measurement rotor. Therefore, the need for manually connecting the calibration arm to the torque measurement rotor can be eliminated so that the workability and safety can be improved. Further, since the connection of the calibration arm is automatically executed, the time for calibration can be reduced.

The automatic torque calibration device desirably further includes a load adjustable mechanism for varying a number or types of calibration weights for applying a load to each of right and left free ends of the calibration arm, wherein, after the torque measurement rotor and the connecting shaft are connected, the control unit controls the load adjustable mechanism so as to execute the torque calibration of the dynamometer while varying the load to be applied to the calibration arm. With this configuration, the varying of the calibration load applied to the calibration arm up to the calibration of a torque can be automatically executed. Also, the need for manually suspending or placing the calibration weights from or on the calibration arm can be eliminated so that the workability and safety can be thereby improved. Further, since the suspension or placement of the calibration weights can be automatically performed, the time for calibration can be reduced, and further there is no need for a user to operate the torque calibration device during a torque calibration, and it is not necessary for the user to attend the torque calibration device all the time while it is operating.

Moreover, the connecting shaft rotated integrally with the calibration arm is coaxially connected with the torque measurement rotor, and therefore the connecting shaft can be easily connected with the torque measurement rotor and it can be conformed to the dynamometer of various sizes compared to a case where it is connected to a side peripheral surface of the torque measurement rotor along a radial direction. Further, since the connecting shaft and the torque measurement rotor are fixed in the rotating direction of the rotor by the rotating direction fixing mechanism, there is no fear that the calibration arm is displaced with respect to the torque measurement rotor during the torque calibration, and the torque calibration can be done with high accuracy.

As a specific embodiment of the engaged part and the rotating direction fixing mechanism, it is desirable that one end of the torque measurement rotor is connected with an output shaft of an engine and the other end thereof is provided with the engaged part that includes a plurality of fixing holes arranged around a rotation center of the torque measurement rotor, wherein the rotating direction fixing mechanism includes, a plurality of fixing pins provided on a tip end of the connecting shaft to be fitted to the fixing holes, an urging member interposed between each of the fixing pins and the connecting shaft so as to urge each of the fixing pins in a direction to be engaged with each of the fixing holes, and an engagement detecting part for detecting whether or not the fixing pins are engaged with the fixing holes, wherein, in the case where the control unit determines that the fixing pins are not engaged with the fixing holes at the connection position based on a detection signal received from the engagement detecting part, the control unit rotates the torque measurement rotor until the fixing pins are engaged with the fixing holes. With this arrangement, the fixing holes and the fixing pins are provided around the center of rotation of the torque measurement rotor and therefore the connecting shaft and the torque measurement rotor can be securely fixed in the rotating direction by the rotating direction fixing mechanism. In addition, since each of the fixing pins is urged by the urging member in an engagement direction, even if the fixing pins are not inserted to the fixing holes, a shock received by each fixing pin can be absorbed by the urging member so that a damage in a connecting portion between the torque measurement rotor and the connecting shaft can be prevented. Further, since the control unit determines the presence or absence of the engagement based on the detection signal from the engagement detecting part to rotate the torque measurement rotor, the fixing pins can be surely inserted to the fixing holes.

It is desirable that the automatic torque calibration device further includes a horizontal adjustment mechanism for adjusting the calibration arm to be in a horizontal position, wherein the control unit controls the horizontal adjustment mechanism so as to adjust the calibration arm to be in the horizontal position in a state that the connecting shaft is connected to the torque measurement rotor. With this arrangement, it is possible to prevent a calibration error from being caused due to a state that the calibration arm is not in a horizontal position under the condition that the calibration arm is connected to the torque measurement rotor. In specific, in the case where the torque measurement rotor is rotated in order to insert the fixing pins to the fixing holes, there is a fear that the connecting shaft and the calibration arm are rotated together with the torque measurement rotor according to a stop response time of the torque measurement rotor in some cases. Therefore, the arrangement as described above is still preferable.

Although it is necessary to execute the torque calibration while the torque measurement rotor is being fixed, if the torque measurement rotor has been fixed before connecting the calibration arm, there may be an undesirable case where the engaged part and the rotating direction fixing mechanism can not be engaged with each other and therefore the connecting shaft can not be securely connected to the torque measurement rotor. Even though the connection can be done, in the case where it is thereafter intended to adjust the calibration arm to be in a horizontal position, the adjustment can not be performed if the torque measurement rotor is fixed. Thus, it is desirable that the rotor fixing mechanism is provided for fixing the torque measurement rotor and that the control unit controls the rotor fixing mechanism to fix the torque measurement rotor under the condition that the calibration arm is adjusted to be in the horizontal position by the horizontal adjustment mechanism.

Advantageous Effects of Invention

According to the present invention configured as mentioned above, it becomes possible to provide an easy-of-use automatic torque calibration device improving workability and safety and attaining reduction in time of a torque calibration.

DESCRIPTION OF EMBODIMENTS

An embodiment of an automatic torque calibration device 100 according to the present invention is described below referring to the accompanying drawings.

<Configuration of Device>

The automatic torque calibration device 100 according to the present embodiment is coupled to an output shaft E1 of a test-targeted engine E such as, e.g., a vehicle engine so as to carry out a torque calibration of an engine dynamometer D which executes a performance test of the test-targeted engine E.

It is noted here that the engine dynamometer D is adapted to apply a load to the test-targeted engine E and output a torque or a revolution number measured by a torque meter or a revolution number meter provided on the engine dynamometer D so that the load is adjusted by a dynamo controller to maintain the torque or revolution number constant. The output shaft E1 of the test-targeted engine E is coupled to one end of an output shaft D1 which is a torque measurement rotor of the dynamometer D. Further, a strain gauge which is a torque meter is attached to the output shaft D1 of the dynamometer.

Figure 1:
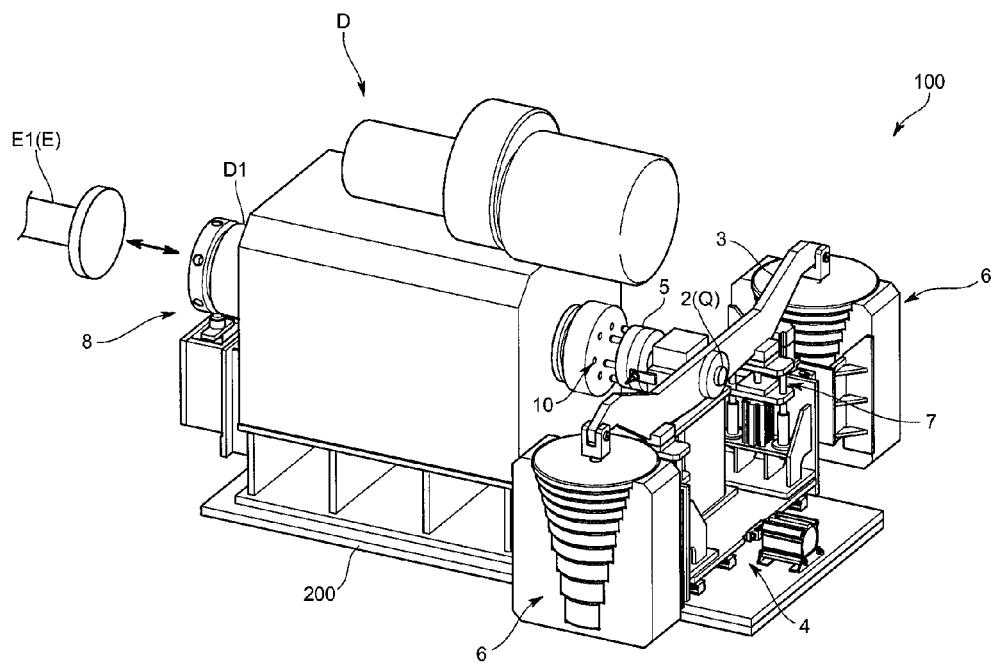
FIG. 1 is a schematic perspective view showing an arrangement of an automatic torque calibration device and an engine dynamometer of the present embodiment.
Figure 2:
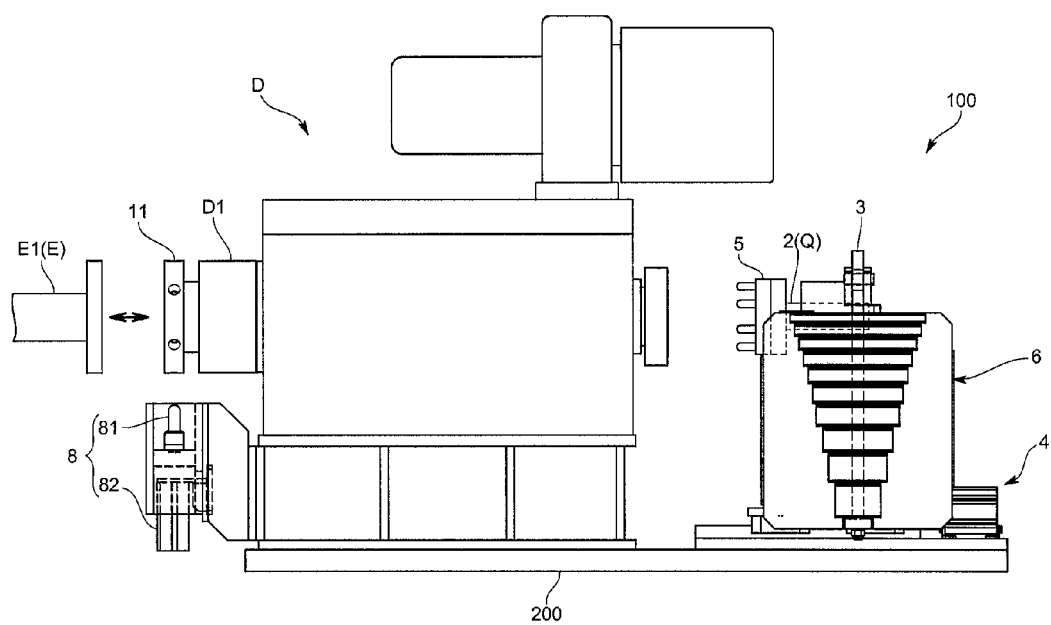
FIG. 2 is a schematic side view showing the arrangement of the automatic torque calibration device and the engine dynamometer of the same embodiment.

In specific, as shown in FIGS. 1 and 2, the automatic torque calibration device 100 is provided at a side of the other end of the output shaft D1 (i.e., torque measurement rotor) of the engine dynamometer D. Specifically, the automatic torque calibration device 100 is provided on a base platform identical to a base platform 200 on which the engine dynamometer D is provided wherein the automatic torque calibration device 100 is provided on the opposite side to the side where the test-targeted engine E is provided with respect to the engine dynamometer D. It is noted here that the base platform on which the automatic torque calibration device 100 is provided may be different from the base platform on which the dynamometer D is provided.

In this arrangement, the automatic torque calibration device 100 includes a connecting shaft 2 that is coaxially connected to the output shaft D1 of the engine dynamometer D, a calibration arm 3 extending in a manner of bilateral symmetry with respect to the connecting shaft 2, a moving mechanism 4 that moves the connecting shaft 2 and the calibration arm 3 back and force with respect to the other end of the output shaft D1 of the dynamometer D, a rotating direction fixing mechanism 5 for fixing the output shaft D1 of the dynamometer D and the connecting shaft 2 in a rotating direction, a load adjustable mechanism 6 varying the number of calibration weights 61 that apply a load to each of right and left free ends of the calibration arm 3, a horizontal adjustment mechanism 7 for horizontally adjusting the calibration arm 3, a rotor fixing mechanism 8 for fixing one end of the output shaft D1 of the dynamometer D, and a control unit 9 for controlling the moving mechanism 4, the load adjustable mechanism 6, the horizontal adjustment mechanism 7 and the rotor fixing mechanism 8. It is noted that the control unit 9 is not shown in FIG. 1 and so forth.

The following describes in detail each of the parts 2 to 9.

Figure 3:
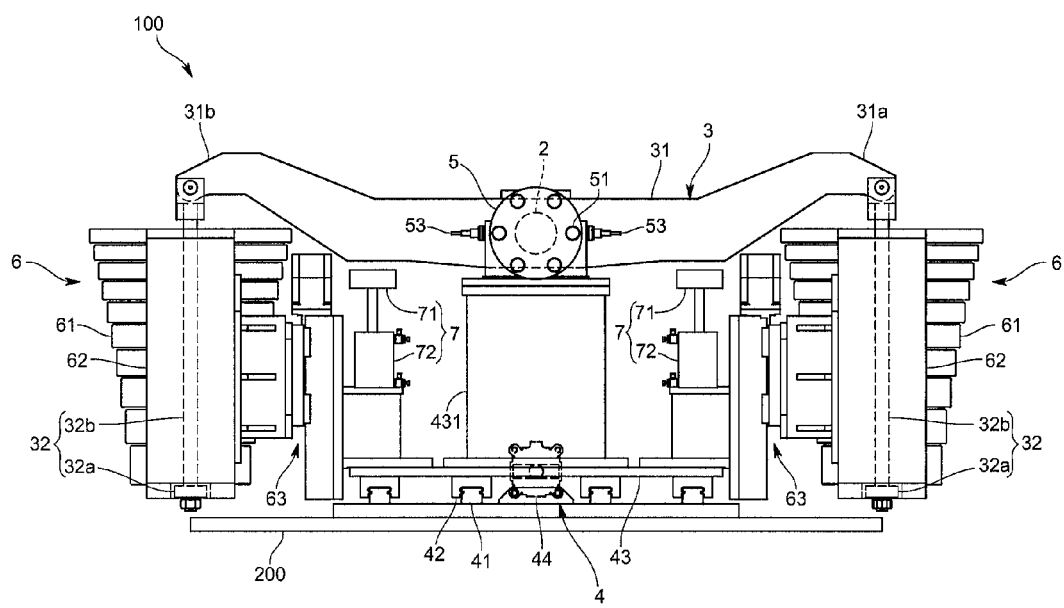
FIG. 3 is a schematic side view showing the automatic torque calibration device of the same embodiment.

As shown in FIGS. 2 and 3, the connecting shaft 2 is rotatably provided in a horizontal direction with respect to the base platform 200 and the rotating direction fixing mechanism 5 to be described later is provided at one end (tip end) in a side of the dynamometer D and the calibration arm 3 is integrally fixed to a side of the other end. The connecting shaft 2 is supported rotatably along a horizontal direction by a supporting post 431 to be described later so that a rotation center thereof is coincident with a rotation center of the output shaft D1 of the dynamometer D.

In particular, as shown in FIG. 3, the calibration arm 3 includes a main arm body 31 which is fixed to the other end of the connecting shaft 2 so as to be rotated integrally with the connecting shaft 2 and a pair of mounting arm parts 32 which are suspended from right and left free ends 31a and 31b of the main arm body 31 so that the calibration weights 61 are mounted thereon. Each of the mounting arm parts 32 includes a mounting board 32a on which the calibration weights 61 are mounted by the load adjustable mechanism 6 as to be described later and a suspension arm element 32b one end of which is disposed on the mounting board 32a and the other end of which is connected to each of the free ends 31a and 31b of the main arm body 31. In this arrangement, the lengths from the connecting shaft 2 to the positions of connecting the mounting arms 32 in the main arm body 31 are respectively set to be a prescribed value (L) in bilateral symmetry so as to be able to calculate a torque (T=N×L) that is generated on the output shaft D1 connected to the connecting shaft 2 by the weight (N) of the calibration weights 61 mounted on the mounting arm parts 32.

The moving mechanism 4 is slid between a connecting position P and a spaced position Q in an axial direction of the connecting shaft 2 as shown in FIGS. 1 to 3. Herein, FIGS. 1 and 2 show a state that the connecting shaft 2 is located in the spaced position. The connecting position P is a position at which the connecting shaft 2 is connected to the other end of the output shaft D1 of the dynamometer D and a torque calibration of the engine dynamometer D is performed by the automatic torque calibration device 100 (see FIG. 4). Further, the spaced position Q is a position at which the connecting shaft 2 is spaced from the other end of the output shaft D1 of the dynamometer D and a performance test of a usual test-targeted engine E is executed (see FIG. 4).

Specifically, as shown in FIG. 3, the moving mechanism 4 includes a rail member 41 provided along the axis direction of the output shaft D1 of the engine dynamometer D (and the connecting shaft 2) on the top surface of the base platform 200, a slider 42 that is slid on the rail member 41, a movable platform 43 provided on the slider 42, and an actuator 44 for sliding the movable platform 43 so as to slide the connecting shaft 2 between the connecting position P and the spaced position Q. The actuator 44 of the present embodiment is an air cylinder having a stroke amount set to be constant and is adapted to be able to stop at two positions of the connecting position P and a retracted position. With use of such an air cylinder, the actuator 44 of the moving mechanism 4 is configured at a low cost. Herein, the air cylinder 44 is operated by compressed air that is supplied or stopped by ON/OFF controlling a solenoid valve provided on the air cylinder 44 by the control unit 9 to be described later. Further, the supporting post 431 is provided on the top surface of the movable platform 43 so as to rotatably support the connecting shaft 2. The actuator 44 is not limited to an air cylinder and a motor-driven one may be used.

The rotating direction fixing mechanism 5 is engaged with engaged parts 10 (see FIG. 10) provided on the other end of the output shaft D1 of the dynamometer D at the connecting position P to fix the output shaft D1 and the connecting shaft 2 so as not to be relatively rotated in the rotational direction.

Figure 4:
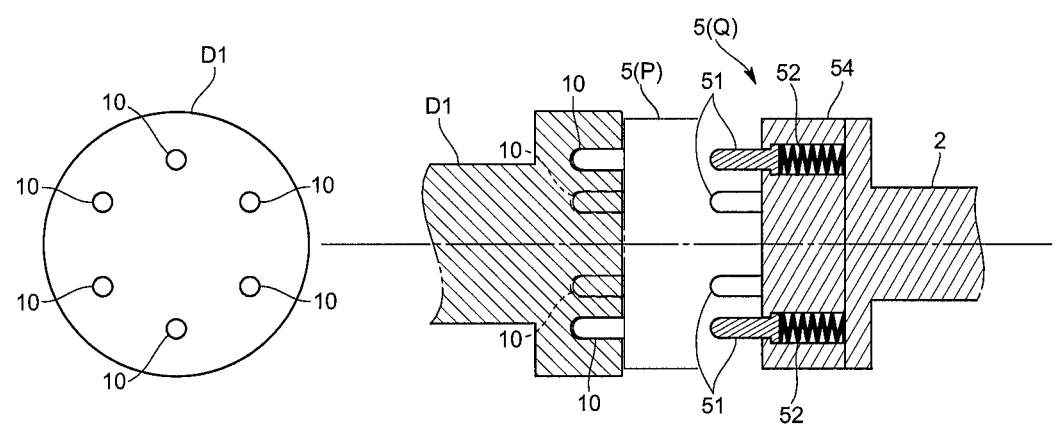
FIG. 4 is a schematic diagram showing a rotating direction fixing mechanism of the same embodiment.

The engaged parts 10 provided on the other end of the output shaft D1 of the dynamometer D are constituted of a plurality of fixing holes which are provided around the rotation axis of the output shaft D1 as shown in FIG. 4. The plurality of fixing holes 10 are provided at regular intervals on the same circle around the rotation axis.

The rotating direction fixing mechanism 5 includes a plurality of fixing pins 51 provided at a tip end portion of the connecting shaft 2 in correspondence with the fixing holes 10, urging members 52 interposed between the fixing pins 51 and the connecting shaft 2 for urging the fixing pins 51 in a direction of engaging the fixing pins 51 with the fixing holes 10, and engagement detecting parts 53 (see FIG. 3) for detecting whether or not the fixing pins 51 are engaged with the fixing holes 10.

Specifically, the fixing pins 51 and the urging members 52 are provided in a holder 54 that is provided at a tip end of the connecting shaft 2. The holder 54 is provided with receiving portions corresponding to the fixing holes 10, and each of the urging members 52 constructed of a coil spring is stretchably accommodated in each of the receiving portions and each of the fixing pins 51 is also slidably received therein.

The holder 54 is also provided with the engagement detecting parts 53 each of which is constructed of a proximity switch (i.e., a position detecting switch operable with no mechanical contact) in the present embodiment. The engagement detecting part 53 is adapted to detect that each fixing pin 51 is present at a predetermined position in each of the receiving portions as a result of being pushed from the outside and inserted to the inside of each of the receiving portions, and then the engagement detecting part 53 outputs an detection signal which is applied to the control unit 9 to be described later.

The load adjustable mechanism 6 is provided at each of the right and left free ends 31a and 31b of the calibration arm 3 as shown in FIG. 3 and it is adapted to vary the number of the calibration weights 61 to be mounted on the mounting arm part 32 of the calibration arm 3. Specifically, the load adjustable mechanism 6 includes a plurality of calibration weights 61, a calibration weight holder 62 for holding the calibration weights 61 and an elevating part 63 for elevating the calibration weight holder 62 in a vertical direction (upward and downward). The elevating part 63 includes a rail member vertically standing on the movable platform 43, a slider which is slid on the rail member and an actuator part for stopping the slider at multiple points on the rail member. The rail member is provided in the vertical direction by a supporting part provided on the movable platform 43. In addition, the calibration weight holder 62 is connected to the slider. Further, the actuator part is adapted to be able to stop the slider every predetermined value, and it includes a ball screw mechanism to which the slider is connected and a stepping motor for driving the ball screw mechanism in the present embodiment. A rotation angle of the stepping motor is controlled by control unit to be described later so that a height position of the calibration weight holder 62 is adjusted.

Figure 5:
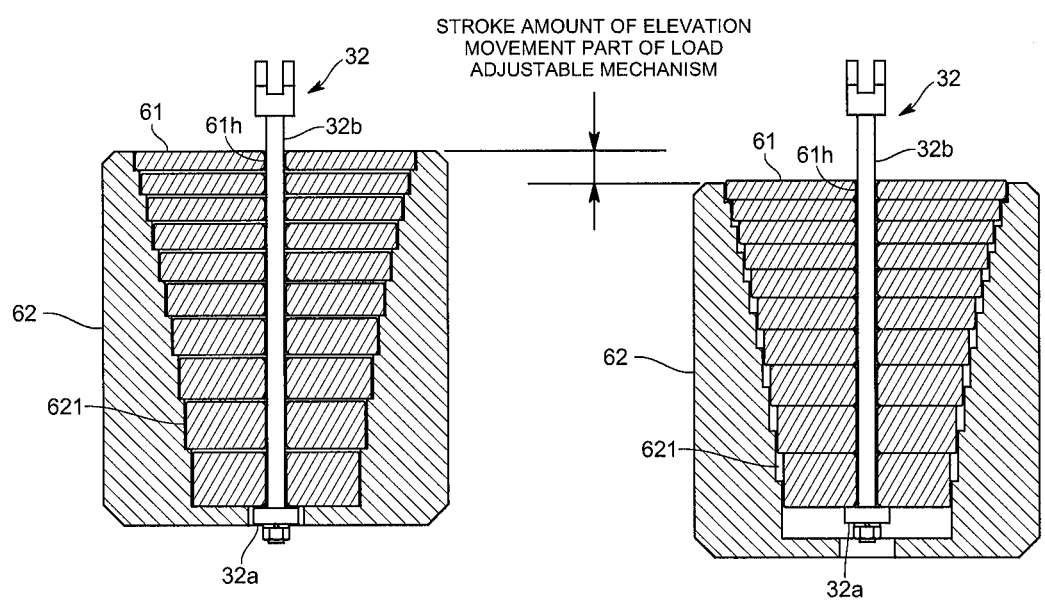
FIG. 5 is a schematic diagram showing a calibrating weight and a calibrating weight holder of a load adjustable mechanism of the same embodiment.

As shown in FIG. 5, each of the multiple calibration weights 61 has a generally disc shape and an through hole 61h is formed at the center portion thereof so that the suspension arm element 32b of the mounting arm part 32 of the calibration arm 3 is inserted through the calibration weights. The through hole 61h has an aperture diameter larger than the diameter of the suspension arm element 32b so as not to be contacted with the suspension arm element 32b. Herein, the mounting board 32a provided at the lower end of the suspension arm element 32b is larger in diameter than the through hole 61h.

Each of the calibration weights 61 has the same weight (e.g., 35 kg) and the entire calibration weights 61 held in the calibration weight holder 62 are arranged to have a configuration such that, the lower the calibration weights 61 are positioned in height, the smaller in diameter and the larger in thickness the calibration weights 61 become.

The calibration weight holder 62 has stepped accommodation recesses 621 formed to have a configuration corresponding to the shapes (diameters and thicknesses) of the multiple calibration weights 61 so that each the calibration weights 61 is accommodated in each of the corresponding accommodation recesses 621 one by one. That is, the lower of the calibration weight holder 62 has a concentrically reducing diameter and an increasing depth of an accommodation space thereof for receiving each of the calibration weights 61. There are formed predetermined gaps between the respective calibration weights 61 under the condition that the calibration weights 61 are respectively accommodated in the accommodation recesses 621.

Thus, when the calibration weight holder 62 is gradually lowered by the elevating part 63, the calibration weights 61 accommodated in the accommodation recesses 621 of the calibration weight holder 62 are placed on the mounting board 32a of the mounting arm part 32 from the bottom in order. Under the condition that the calibration weights 61 are placed on the mounting arm part 32, the corresponding calibration weights 61 are kept from contact with the other calibration weights 61 that are not placed on the mounting arm part 32 (i.e., the calibration weights 61 accommodated in the calibration weight holder 62). FIG. 5 shows the state that the calibration weights 61 are not placed on the calibration arm 3 (drawing on the left side) and the state that the entire calibration weights 61 are placed on the calibration arm 3 (drawing on the right side).

As shown in FIG. 3, the horizontal adjustment mechanisms 7 are provide in bilateral symmetry on both sides of the connecting shaft 2 below the main arm body 31 of the calibration arm 3 so that the main arm body 31 is adjusted to be in the horizontal position by pushing up the both right and left sides of the main arm body 31. Specifically, each of the horizontal adjustment mechanisms 7 includes a movable member 71 provided movably in a vertical direction on the top surface of the movable platform 43 and an actuator 72 slidably moving the movable member 71 in the vertical direction. The actuator 72 is configured by using an air cylinder so that the pair of the horizontal adjustment mechanisms 7 is provided in bilateral symmetry on both sides of the connecting shaft 2 push up the main arm body 31 by the same force. Thus, the calibration arm 3 (i.e., main arm body 31) is adjusted to be in a horizontal position. The air cylinder 72 is operated by compressed air that is supplied or stopped by ON/OFF controlling the solenoid valve provided on the air cylinder 72 by the control unit 9 to be described later. Note that, if the stroke amounts of the air cylinders 72 of the pair of horizontal adjustment mechanisms 7 are set to be equal to a stroke amount when the main arm body 31 is in the horizontal position, the main arm body 31 can be also adjusted to be in the horizontal position by pushing up the main arm body 31 by the horizontal adjustment mechanism 7. Note that the actuator 72 is not limited to an air cylinder and it may be also constituted of a motor-driven one and the like.

Figure 6:
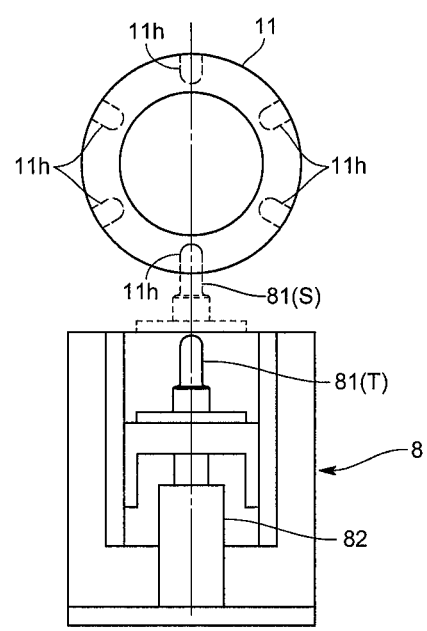
FIG. 6 is a schematic diagram showing a rotor retaining mechanism of the same embodiment.

The rotor fixing mechanism 8 is adapted to fix one end of the output shaft D1 of the dynamometer D to the base platform 200. More specifically, the connecting shaft 2 is connected to the other end of the output shaft D1 of the dynamometer D and after the calibration arm 3 is adjusted to be in a horizontal position by the horizontal adjustment mechanism 7, the rotor fixing mechanism 8 fixes one end of the output shaft D1 to the base platform 200. Referring to a configuration in specific, as shown in FIGS. 2 and 6, the rotor fixing mechanism 8 includes a fixing pin 81 which is provided at a side of the one end of the output shaft D1 and is inserted to one of insertion holes 11h provided in an outer peripheral surface of the coupling member 11 to which the output shaft E1 of the test-targeted engine E is connected, and further includes an actuator 82 for slidably moving the fixing pin 81 between an insertion position S and a release position T.

The fixing pin 81 and the actuator 82 are disposed below the coupling member 11 and the fixing pin 81 is slidably moved toward the coupling member 11 along the vertical direction. In the present embodiment, the actuator 82 is constituted of an air cylinder and it is operated by compressed air that is supplied or stopped by ON/OFF control of a solenoid valve provided on the air cylinder 72 controlled by the control unit 9 to be described later. Herein, the insertion position S indicates a position where the fixing pin 81 is inserted to the insertion hole 11h and one end of the output shaft D1 is fixed to the base platform 200. The release position T indicates a position where the fixing pin 81 is released from the insertion hole 11h and the one end of the output shaft D1 is released from fixture to the base platform 200 (see FIG. 6). Herein, the actuator 82 is not limited to an air cylinder and it may be constituted of a motor-driven one.

The insertion holes 11h are formed in the coupling member 11 provided on one end of the output shaft D1 in the following manner. That is, one of the insertion holes 11h is vertically directed downward to face the fixing pin 81 in a state that the connecting shaft 2 is connected to the output shaft D1 (and further the calibration arm 3 is adjusted to be in a horizontal position). Since the output shaft D1 is adapted to be connectable to the connecting shaft 2 at multiple rotation angles in one rotation, the plurality of insertion holes 11h are also provided in correspondence with the respective rotation angles to be connected in order that the fixing pin 81 can be inserted at each of the rotation angles to be connected. In the present embodiment, since a plurality of fixing holes are formed at 60 degrees intervals in the output shaft D1 so as to be connectable to the connecting shaft 2 every 60 degrees, the insertion holes 11h are also arranged at 60 degrees intervals.

Figure 7:
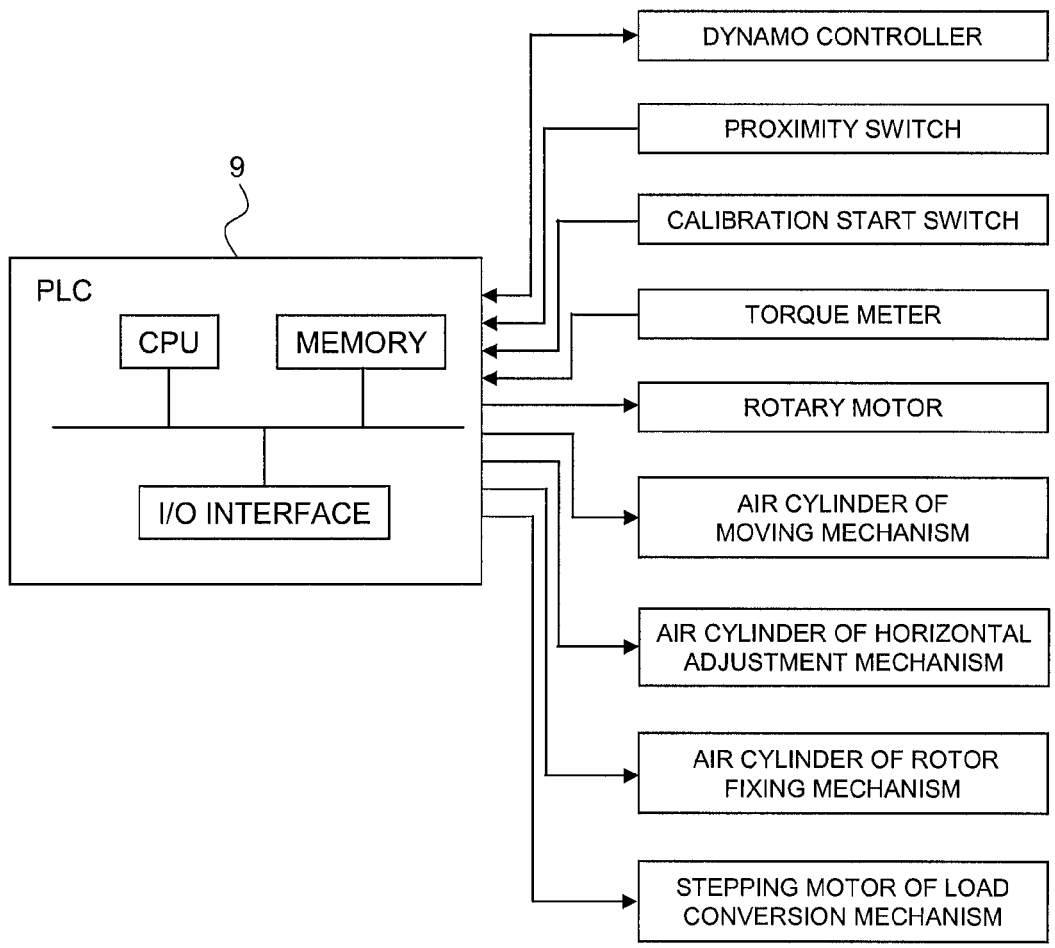
FIG. 7 is a diagram showing exchanges of signals between a control unit and a group of actuators and sensors of the same embodiment.

The control unit 9 is adapted to control the moving mechanism 4, the load adjustable mechanism 6, the horizontal adjustment mechanism 7 and the rotor fixing mechanism 8 so as to automate the calibration of a torque. As an equipment configuration thereof, as shown in FIG. 7, it is constituted by using a dedicated computer such as, e.g., a PLC (programmable logic controller) including a CPU, a memory, an I/O interface and the like, or a general-purpose computer. Thus, the CPU and peripheral equipments are cooperated in accordance with a program stored in the memory so as to exchange signals with each of parts as shown in FIG. 7, whereby the multiple mechanisms mentioned above are controlled in sequence according to a predetermined operating procedure to be described later so that the torque calibration is automatically performed.

<Operation Procedure>

Figure 8:
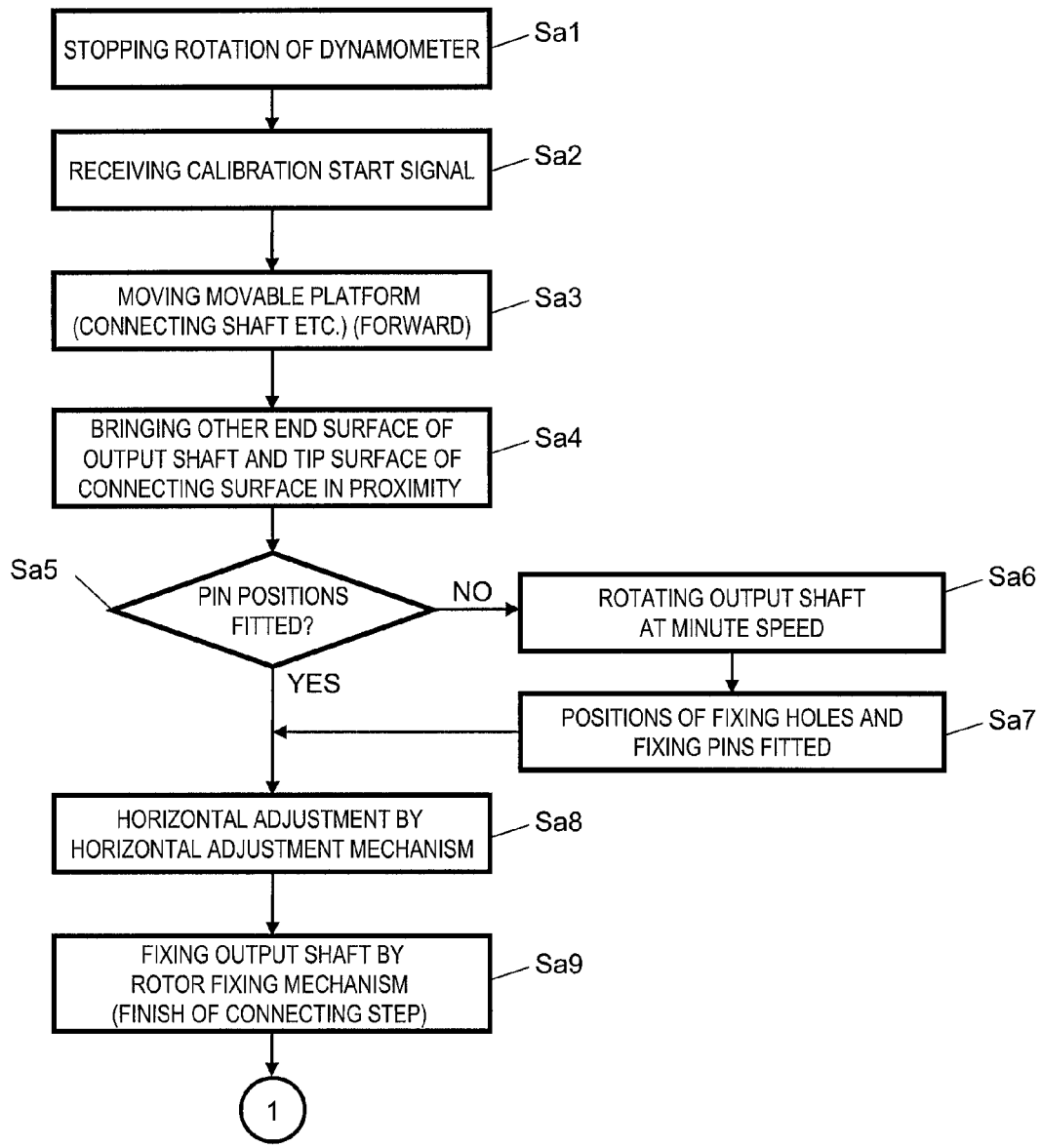
FIG. 8 is a flowchart showing an example of a connecting step of the automatic torque calibration device of the same embodiment.
Figure 9:
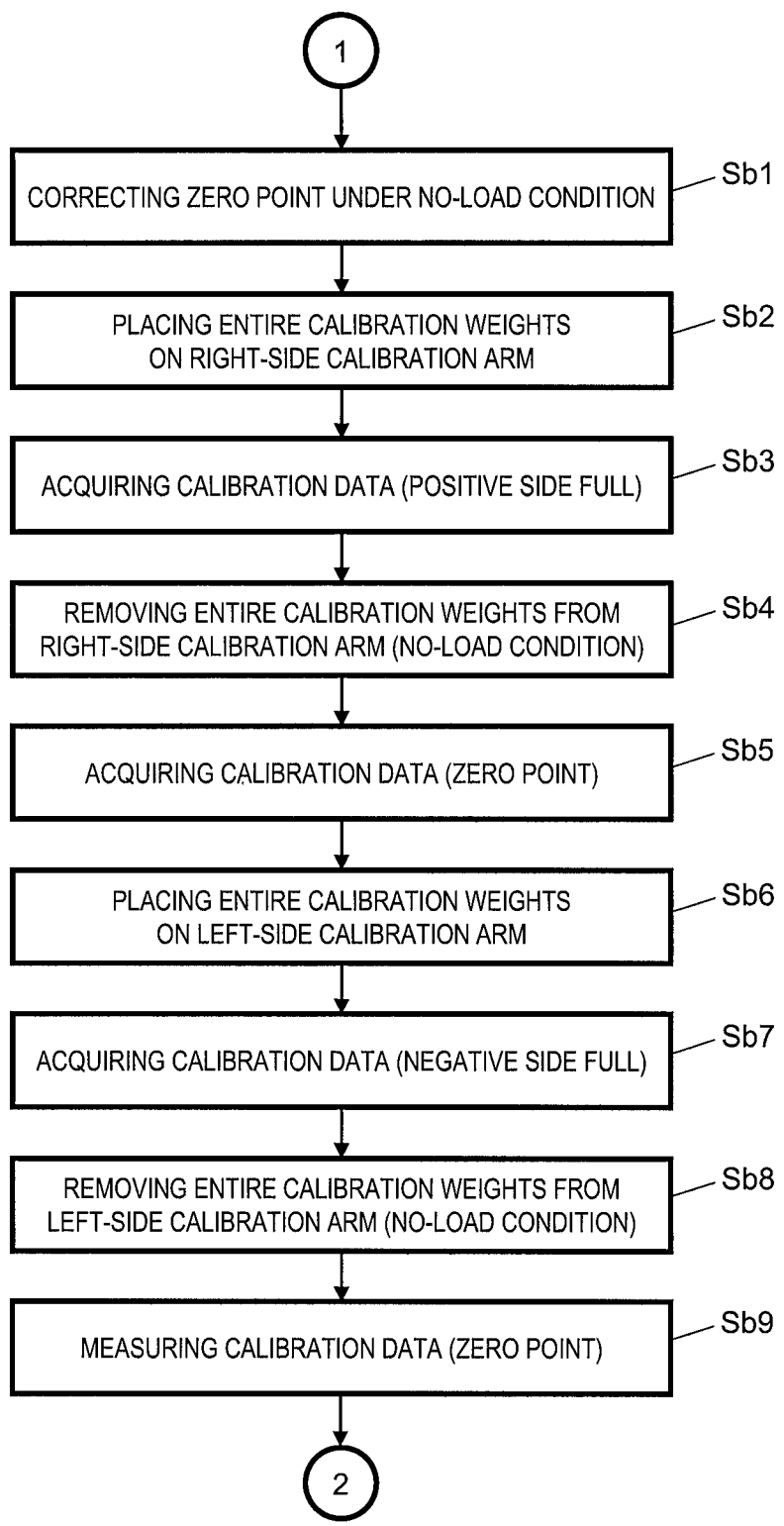
FIG. 9 is a flowchart showing an example of a torque calibration step of the automatic torque calibration device of the same embodiment.
Figure 10:
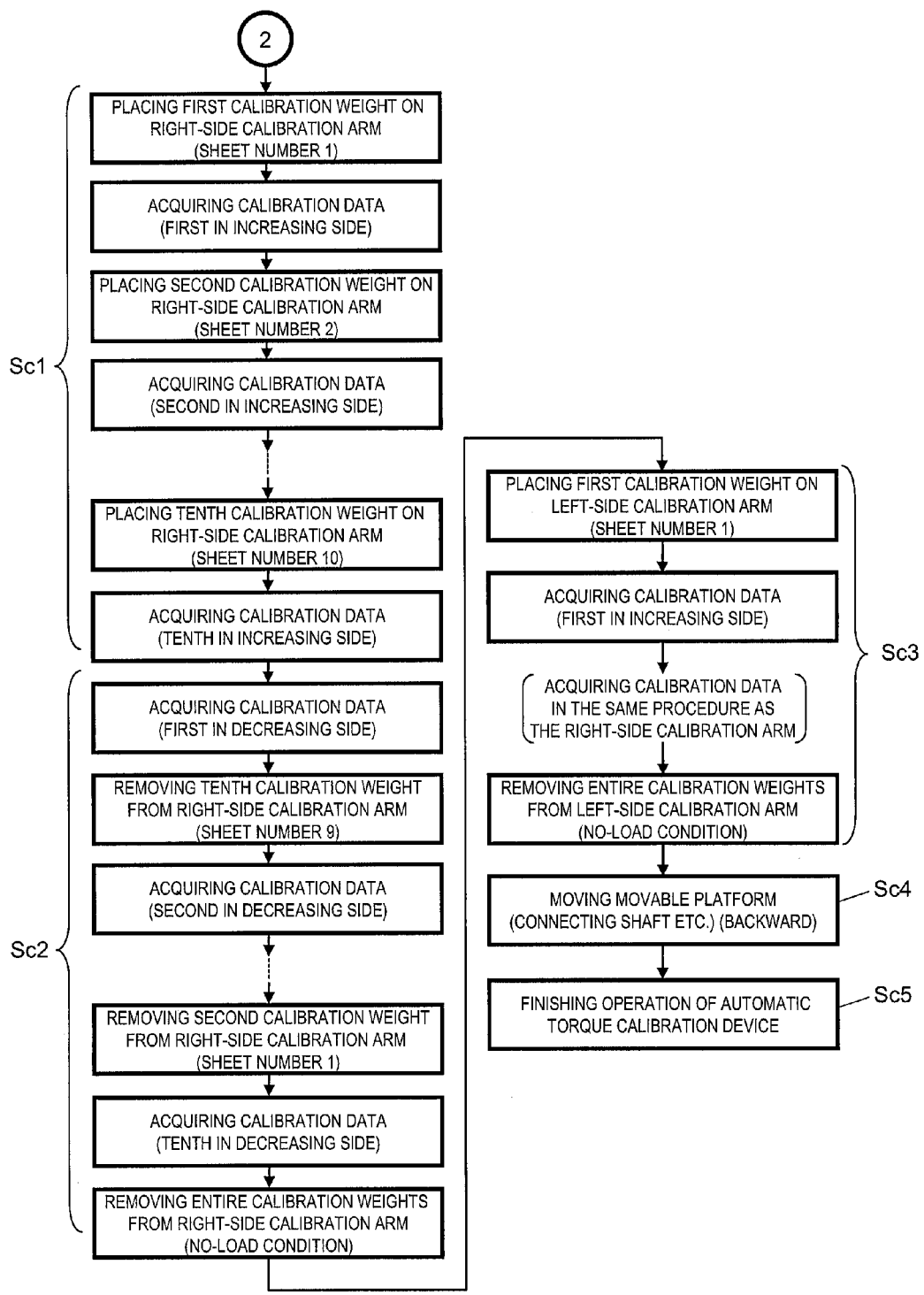
FIG. 10 is a flowchart showing an example of a torque calibration step of the automatic torque calibration device of the same embodiment.

The following describes an example of an operation of the automatic torque calibration device 100 of the present embodiment together with an operation of the control unit 9 referring to flow charts of FIGS. 8 to 10.

(1) Connecting Step (See FIG. 8)

First, in the case where a performance test of the test-targeted engine E is carried out by the dynamometer D, the dynamometer D is stopped and a rotation of the output shaft D1 is stopped (Step Sa1).

After confirming that the output shaft D1 of the dynamometer D is stopped, a calibration start switch S1 connected to the I/O interface of the control unit 9 is pushed on. Upon receipt of a calibration start signal from the calibration start switch S1, the control unit 9 starts the connecting step in the automatic torque calibration in the following order (Step Sa2). However, before the start of the torque calibration, the connecting shaft 2 of the automatic torque calibration device 100 is positioned at a spaced position Q and it is non-connected with the output shaft D1 of the dynamometer D.

In order to connect the automatic torque calibration device 100 to the output shaft D1 of the dynamometer D, the control unit 9 first controls the solenoid valve of the air cylinder 44 in the moving mechanism 4. Thus, the air cylinder 44 moves the movable platform 43 to a side of the dynamometer D (Step Sa3). At this time, not only the connecting shaft 2 and the calibration arm 3 provided on the movable platform 43 but also the load adjustable mechanism 6 and the horizontal adjustment mechanism 7 are also moved to a side of the dynamometer D together with the connecting shaft 2.

The movable platform 43 is moved to a side of the dynamometer D by the air cylinder 44 so that the other end face of the output shaft D1 is in proximity to a tip face of the connecting shaft 2 (Step Sa4). At this time, it is sufficient that the other end face of the output shaft D1 and the tip face of the connecting shaft 2 may be in proximity to each other in a degree that the fixation of the rotating direction can be secured by the rotating direction fixing mechanism 5, and it is not necessary that the other end face of the output shaft D1 and the tip face of the connecting shaft 2 are contacted.

Herein, the control unit 9 acquires a detection signal from the proximity switch 53 serving as an engagement detecting part in the rotating direction fixing mechanism 5 and determines whether or not the fixing pins 51 are inserted to the fixing holes 10, in other words, determines whether or not the circumferential positions of the fixing pins 51 and the fixing holes 10 are fitted (Step Sa5). If the fixing pins 51 are not inserted to the fixing holes 10, a rotary motor (not shown) provided in the engine dynamometer D is controlled to rotate the output shaft D1 at a minute speed of, e.g., 1 rpm (Step Sa6). At this time, in the case where the detection signal from the engagement detecting part 53 is acquired all the time to detect that the fixing pins are inserted to the fixing holes 10, the rotary motor is stopped so that the rotation of the output shaft D1 is stopped (Step Sa7). It is noted that the rotary motor for rotating the output shaft D1 at a minute speed may be an existing rotary motor or a separately added rotary motor. If it is difficult to rotate the output shaft D1 at a minute speed by the existing rotary motor, it is desirable to separately provide a rotary motor for rotating at a minute speed.

Subsequently, the control unit 9 controls the solenoid valve of the air cylinder 72 of the horizontal adjustment mechanism 7 to adjust the calibration arm 3 to be in the horizontal position (Step Sa8). The control unit 9 elevates the movable member 71 of the horizontal adjustment mechanism 7 upward to adjust the main arm body 31 to be in the horizontal position and thereafter moves the movable member 71 away from the main arm body 31. After finishing the horizontal adjustment, the control unit 9 controls the compressed air to be supplied to the air cylinder serving as the actuator 82 of the rotor fixing mechanism 8 so as to insert the fixing pins 81 to the insertion holes 11h of the coupling member 11. Thus, the one end of the output shaft D1 is fixed to the base platform 200 (Step Sa9).

Herein, it is also possible to fix the output shaft D1 by the rotor fixing mechanism 7 under the condition that the movable member 71 of the horizontal adjustment mechanism 7 is in contact with the main arm body 31 and thereafter the movable member 71 may be moved away from the main arm body 31.

(2) Torque Calibration Step (2-1) Zero Span Calibration Step (See FIG. 8)

First, the control unit 9 acquires a torque measurement value of a torque meter provided in the dynamometer D directly or via a dynamo controller in a state that the load of the calibration weights 61 is not applied to the calibration arm 3 (i.e., in a no-load condition), thereby setting a zero point (Step Sb1).

Then, the control unit 9 controls the rotation angle of the stepping motor of the load adjustable mechanism 6 provided below the calibration arm 3 on the right hand to thereby lower the calibration weight holder 62 so that the calibration weights 61 accommodated in the holder 62 are entirely placed on the mounting plate 32a on the right hand (Step Sb2). At this time, the torque measurement value of the torque meter provided in the dynamometer D is acquired directly or via the dynamo controller so as to acquire calibration data in a positive side full range (Step Sb3). Herein, the calibration data can be obtained by comparing the torque measurement value of the torque meter and a torque calculation value obtained from a weight of the calibration weights 61 and a length of the calibration arm.

Next, the control unit 9 controls the stepping motor of the load adjustable mechanism 6 on the right hand to elevate the calibration weight holder 62 upward so that the calibration weights 61 placed on the mounting plate 32a on the right hand are entirely removed from the calibration arm 3 (to be in no-load condition) (Step Sb4). Subsequently, the control unit 9 acquires the torque measurement value of the torque meter directly or via the dynamo controller so that the acquired value is set as a zero point (Step Sb5).

Then, the control unit 9 controls the rotation angle of the stepping motor of the load adjustable mechanism 6 provided below the calibration arm 3 on the left hand to thereby lower the calibration weight holder 62 so that the calibration weights 61 accommodated in the holder 62 are entirely placed on the mounting plate 32a on the left hand (Step Sb6). At this time, the torque measurement value of the torque meter provided in the dynamometer D is acquired directly or via the dynamo controller so as to acquire calibration data in a negative side full range (Step Sb7).

Next, the control unit 9 controls the stepping motor of the load adjustable mechanism 6 on the left hand to elevate the calibration weight holder 62 upward so that the calibration weights 61 placed on the mounting plate 32a on the left hand are entirely removed from the calibration arm 3 (to be in no-load condition) (Step Sb8). Subsequently, the control unit 9 acquires the torque measurement value of the torque meter directly or via the dynamo controller so that the acquired value is set as a zero point (Step Sb9).

(2-2) Calibration Step

After finishing the zero span calibration step, the control unit 9 controls the stepping motor of any one of the right and left load adjustable mechanisms 6 to place the calibration weights 61 one by one on the mounting plate 32a so as to increase in stepwise each of the weight loads to be applied to the calibration arm 3 so that the calibration data in each of the weight loads is acquired (Step Sc1).

More specifically, the control unit 9 controls the stepping motor of the load adjustable mechanism 6 on the right hand so as to place a first calibration weight 61 (i.e., a lowermost calibration weight 61 accommodated in the calibration weight holder 62) on the mounting plate 32a of the calibration arm 3. At this time, the control unit 9 acquires a torque measurement value from the torque meter so as to acquire the first calibration data of the torque in a side of the increasing calibration. Subsequently, the control unit 9 controls the stepping motor of the load adjustable mechanism 6 on the right hand so as to place a second calibration weight 61 (i.e., a second lowermost calibration weight 61 from the bottom accommodated in the calibration weight holder 62) on the mounting plate 32a of the calibration arm 3. At this time, the control unit 9 acquires a torque measurement value from the torque meter so as to acquire the second calibration data of the torque in the increasing calibration side. Similarly, the control unit 9 controls the stepping motor of the load adjustable mechanism 6 on the right hand to place third to tenth (i.e., up to the top) calibration weights 61 one by one added on the mounting plate 32a so that ten pieces of the calibration data of the torques are acquired in the increasing calibration side.

Next, the control unit 9 controls the stepping motor of the load adjustable mechanisms 6 to remove the ten pieces of the calibration weights 61 placed on the mounting plate 32a one by one so as to decrease in stepwise each of the weight loads applied to the calibration arm 3 so that the calibration data in each of the weight loads is acquired (Step Sc2).

In specific, the control unit 9 controls the stepping motor of the load adjustable mechanism 6 on the right hand so as to remove the tenth calibration weight 61 (i.e., an uppermost calibration weight 61 accommodated in the calibration weight holder 62) from the mounting plate 32a. At this time, the control unit 9 acquires a torque measurement value from the torque meter so as to acquire the first calibration data of the torque in a side of the decreasing calibration. Subsequently, the control unit 9 controls the stepping motor of the load adjustable mechanism 6 on the right hand to remove the ninth calibration weight 61 (i.e., a second uppermost calibration weight 61 accommodated in the calibration weight holder 62) from the mounting plate 32a. At this time, the control unit 9 acquires a torque measurement value from the torque meter so as to acquire the second calibration data of the torque in the decreasing calibration side. Similarly, the control unit 9 controls the stepping motor of the load adjustable mechanism 6 on the right hand to remove the eighth to the first (i.e., up to the bottom) calibration weights 61 one by one from the mounting plate 32a so that ten pieces of the calibration data of the torques are acquired in the decreasing calibration side.

Similarly to the load adjustable mechanism 6 on the right hand, the control unit 9 also controls the stepping motor of the load adjustable mechanism 6 on the left hand to acquire ten pieces of the calibration data in the increasing and decreasing calibration sides, respectively (Step Sc3). Since each of the calibration weights 61 has the same weight, the calibration data acquired by the above procedure can be obtained at regular intervals from the zero point to the full range so that the calibration accuracy can be improved.

After finishing the acquirement of the calibration data in each of the calibration weights 69 (i.e., each weight load) both in the right and left load adjustable mechanisms 6, the control unit 9 controls the moving mechanism 4 so as to slidably move the connecting shaft 2 to the spaced position Q along the axial direction of the output shaft D1 (Step Sc4). By the operation procedure described above, the automatic torque calibration of the automatic torque calibration device 100 is ended (Step Sc5).

Effect of the Present Embodiment

According to the automatic torque calibration device 100 according to the present embodiment configured as described above, it is possible to automatically perform the operations from connection of the calibration arm 3 to the torque measurement rotor to the varying of the calibration load applied to the calibration arm 3 and the calibration of a torque. Accordingly, the need for manually connecting the calibration arm 3 to the torque measurement rotor can be eliminated so that the workability and safety can be improved. Also, the need for manually suspending or placing the calibration weights 61 from or on the calibration arm 3 can be eliminated and the workability and safety can be thereby improved. Further, since the connection of the calibration arm 3 and the suspension or placement of the calibration weights 61 can be automatically performed, the time for calibration can be reduced, and further there is no need for a user to operate the torque calibration device during a torque calibration, and also it is not necessary for the user to attend the torque calibration device all the time while it is operating.

Moreover, the connecting shaft 2 rotated integrally with the calibration arm 3 is coaxially connected with the torque measurement rotor, and therefore the connecting shaft 2 can be easily connected with the torque measurement rotor and it can be conformed to the dynamometer D of various sizes compared to a case where it is connected to a side peripheral surface of the torque measurement rotor along a radial direction. Further, since the connecting shaft 2 and the torque measurement rotor are fixed in the rotating direction of the rotor by the rotating direction fixing mechanism 5, there is no fear that the calibration arm 3 is displaced with respect to the torque measurement rotor during the torque calibration, and the torque calibration can be done with high accuracy.

Furthermore, the fixing holes 10 and the fixing pins 51 are provided around the center of rotation of the output shaft D1 and therefore the connecting shaft 2 and the torque measurement rotor can be securely fixed in the rotating direction by the rotating direction fixing mechanism 5. In addition, since each of the fixing pins 51 is urged by the coil spring 52 in an engagement direction, a shock received by each fixing pin 51 can be absorbed by the coil spring 52 so that a damage in a connecting portion between the output shaft D1 and the connecting shaft 2 can be prevented. Further, since the control unit 9 determines the presence or absence of the engagement based on the detection signal from the proximity switch 54 to rotate the output shaft D1, the fixing pins 51 can be surely inserted to the fixing holes 10.

Other Alternative Embodiment

Note that the present invention is not limited to the embodiment described above.

For example, although the automatic torque calibration device of the embodiment already described is adapted to automatically calibrate the engine dynamometer, it can be also adapted to a chassis dynamometer. In this case, a connecting shaft is coupled to a rotation roller of the chassis dynamometer along an axial direction.

Moreover, although the engaged part includes the fixing holes and the rotating direction fixing mechanism includes the fixing pins etc. in the embodiment already described, the reverse thereof may be possible. That is, the engaged part may include the fixing pins etc. and the rotating direction fixing mechanism may include the fixing holes.

Further, the engaged part and the rotating direction fixing mechanism are not limited to the fixing holes and fixing pins, the other shapes and structures may be possible as long as the rotation in the rotating direction is fixed. For example, the engaged part may include recesses symmetrically arranged around the center of the rotation of the output shaft and the rotating direction fixing mechanism may include protrusions to be fit to the recesses.

Figure 11:
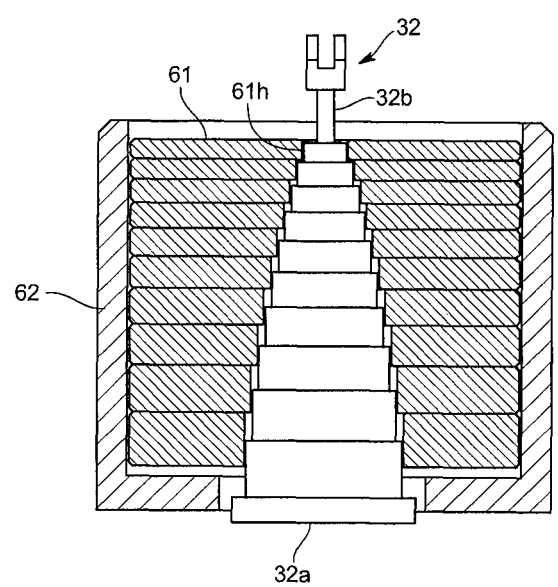
FIG. 11 is a schematic diagram showing a calibrating weight and a calibrating weight holder of a load adjustable mechanism of an alternative embodiment.

Furthermore, as a configuration of the load adjustable mechanism, it may be configured such that, with the elevation movement of the calibration weight holder, the calibration weights accommodated in the calibration weight holder are placed on the mounting arm part one by one. Also, as shown in FIG. 11, it may be configured such that, the lower the positioning of the calibration weights, the larger the through holes formed in the calibration weights, and that the diameters of the mounting plates are increased in stepwise toward the lower in positioning thereof in accordance with the corresponding through holes.

In addition, although the dynamo controller and the control unit are separately configured in the embodiment already described, these may be constituted of a common computer.

Figure 12:
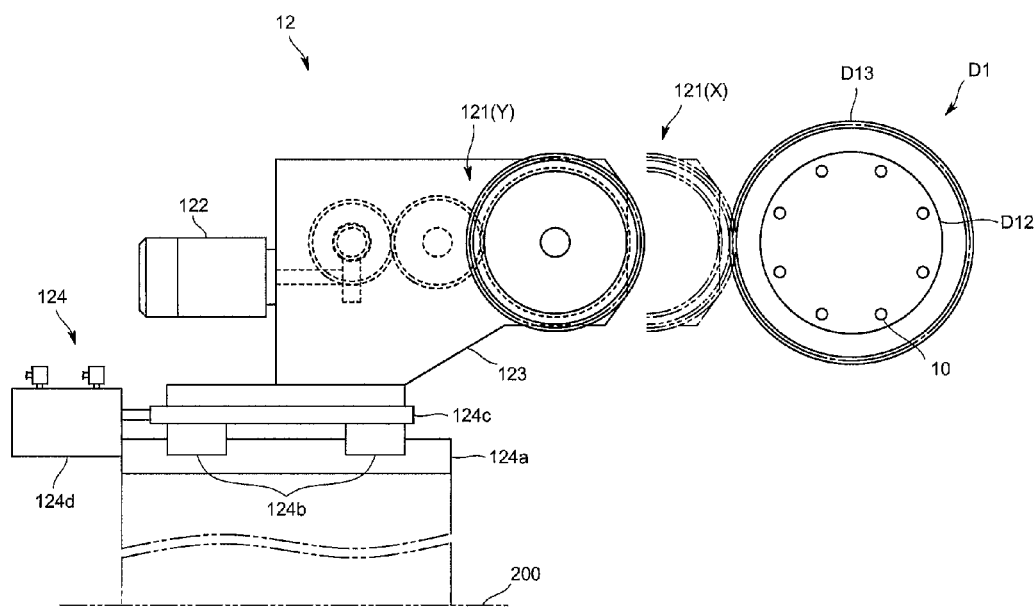
FIG. 12 is a schematic diagram showing an output shaft and a shaft rotation mechanism according to the alternative embodiment.

Further, as shown in FIG. 12, the automatic torque calibration device may include an output shaft rotating mechanism 12 for rotating the output shaft D1.

Figure 13:
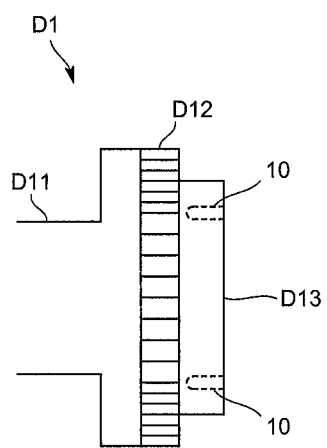
FIG. 13 is a schematic diagram showing a configuration of the output shaft according to the alternative embodiment.

In this case, as shown in FIG. 13, the output shaft D1 includes an output shaft main body D11, a gear member D12 fixed to a tip end of the output shaft main body D11 coaxially with the output shaft main body D11 and a flange member D13 fixed to a tip end of the gear member D12 coaxially with the output shaft main body D11. The fixing holes 10 for inserting the fixing pins 51 are formed in a tip surface of the flange member. Herein, the flange member D13 is detachable with respect to the gear member D12 and the gear member D12 is detachable with respect to the output shaft main body D11. With this arrangement like this, when it is necessary to replace the gear member D12 because of a wear and the like, only the gear member D12 can be replaced.

In the case where the fixing pins 51 are not inserted to the fixing holes 10 in a connecting step, i.e., in the case where the circumferential positions of the fixing pins 51 and the fixing holes 10 are not fitted, this output shaft rotating mechanism 12 externally applies a rotational force to the output shaft D1 so as to rotate the output shaft D1, and the output shaft rotating mechanism 12 is located aside the output shaft D1 on the base platform 200. In specific, the output shaft rotating mechanism 12 is engaged with the gear member D12 provided on the output shaft D1 so as to rotate the output shaft D1, and the output shaft rotating mechanism 12 includes a gear element 121 engaged with teeth of the gear member D12, a rotary motor 122 for rotating the gear element 121, a holding member 123 for holding the gear element 121 and the rotary motor 122, and a holding member moving mechanism 124 for moving the holding member 123 between an engagement position X where the gear element 121 is engaged with the gear member D12 and a retracting position Y where the gear element 121 is moved away from the gear member D12.

The holding member moving mechanism 124 is fixed onto the base platform 200 and is adapted to slide the holding member 123 in a horizontal direction perpendicular to the axial direction of the output shaft D1. The holding member moving mechanism 124 includes a rail 124a, a slider 124b slidably mounted on the rail 124a, a fixing base 124c to which the holding member 123 located on the slider 124b is fixed, and an actuator part 124d such as, e.g., an air cylinder for sliding the slider 124c on the rail 124a.

In the automatic torque calibration device 100 having the output shaft rotating mechanism 12, in the case where the fixing pins 51 are not inserted to the fixing holes 10, the control unit 9 controls the actuator part 124d of the holding member moving mechanism 124 so as to move the holding member 123 (gear element 121) from the retracting position Y to the engagement position X. Then, the control unit 9 controls the rotary motor 122 so as to rotate the flange member D13 at a minute speed such as, e.g., 1 rpm via the gear element 121 and the gear member D12 (corresponding to Step Sa6 in the embodiment already described).

In addition, it is needless to say that the present invention is not limited to the embodiments described above and various changes and modifications thereof can be made within a range unless it departs from the spirit of the present invention.

REFERENCE SIGNS LIST

100 . . . Automatic torque calibration device
D . . . Dynamometer
D1 . . . Torque measurement rotor (output shaft of dynamometer)
200 . . . Base platform
2 . . . Connecting shaft
3 . . . Calibration arm
P . . . Connection position
Q . . . Spaced position
4 . . . Moving mechanism
10 . . . Engaged part
5 . . . Rotating direction fixing mechanism
51 . . . Fixing pin
52 . . . Urging member
53 . . . Engagement detecting part
6 . . . Load adjustable mechanism
61 . . . Calibration weight
7 . . . Horizontal adjustment mechanism
8 . . . Rotor fixing mechanism
9 . . . Control unit

The invention claimed is:

1. An automatic torque calibration device connected to a torque measurement rotor of a dynamometer to execute a torque calibration of the dynamometer, wherein one end of the torque measurement rotor is configured to be connected with an output shaft of an engine and wherein the automatic torque calibration device is provided at a side of an other end of the torque measurement rotor, the automatic torque calibration device comprising:
   a connecting shaft rotatably provided with respect to a base platform and coaxially connected to the torque measurement rotor;
   a calibration arm integrally rotated with the connecting shaft and extended with respect to the connecting shaft;
   a moving mechanism adapted to move the connecting shaft between a connection position where the connecting shaft is connected to the other end of the torque measurement rotor and a spaced position spaced away from the other end of the torque measurement rotor;
   a rotating direction fixing mechanism engaged with an engaged part provided on the torque measurement rotor at the connection position so as to fix the torque measurement rotor and the connecting shaft in the rotating direction; and
   a control unit adapted to control the moving mechanism,
   wherein the control unit controls the moving mechanism to move the connecting shaft to the connection position so as to fix the torque measurement rotor and the connecting shaft to be connected in the rotating direction by the rotating direction fixing mechanism.

2. The automatic torque calibration device according to claim 1 further comprising a load adjustable mechanism for varying the number or types of calibration weights for applying a load to each of right and left free ends of the calibration arm,
   wherein, after the torque measurement rotor and the connecting shaft are connected, the control unit controls the load adjustable mechanism so as to execute the torque calibration of the dynamometer while varying the load to be applied to the calibration arm.

3. The automatic torque calibration device according to claim 1,
   wherein the other end of the torque measurement rotor is provided with the engaged part that includes a plurality of fixing holes arranged around a rotation center of the torque measurement rotor,
   wherein the rotating direction fixing mechanism comprises a plurality of fixing pins provided on a tip end of the connecting shaft to be fitted to the fixing holes, an urging member interposed between each of the fixing pins and the connecting shaft so as to urge each of the fixing pins in a direction to be engaged with each of the fixing holes, and an engagement detecting part for detecting whether or not the fixing pins are engaged with the fixing holes, and
   wherein, in the case where the control unit determines that the fixing pins are not engaged with the fixing holes at the connection position based on a detection signal received from the engagement detecting part, the control unit controls the torque measurement rotor to be rotated until the fixing pins are engaged with the fixing holes.

4. The automatic torque calibration device according to claim 1 further comprising a horizontal adjustment mechanism for adjusting the calibration arm to be in a horizontal position, wherein the control unit controls the horizontal adjustment mechanism so as to adjust the calibration arm to be in the horizontal position in a state that the connecting shaft is connected to the torque measurement rotor.

* * * * *